US012678936B2

(12) United States Patent
Shin et al.

(10) Patent No.: US 12,678,936 B2
(45) Date of Patent: Jul. 14, 2026

(54) PNEUMATIC ENERGY GENERATION DEVICE

(71) Applicant: INDUSTRY-ACADEMIC COOPERATION FOUNDATION, YONSEI UNIVERSITY, Seoul (KR)

(72) Inventors: Dong Jun Shin, Seoul (KR); Seung Ryeol Lee, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 18/976,023

(22) Filed: Dec. 10, 2024

(65) Prior Publication Data

US 2025/0215907 A1     Jul. 3, 2025

(30) Foreign Application Priority Data

Dec. 29, 2023     (KR) ........................ 10-2023-0196977

(51) Int. Cl.
| | |
|---|---|
| *F04B 35/04* | (2006.01) |
| *B25J 9/00* | (2006.01) |
| *B25J 9/14* | (2006.01) |
| *F04B 15/08* | (2006.01) |
| *F04B 41/02* | (2006.01) |

(52) U.S. Cl.
CPC ............. *B25J 9/0006* (2013.01); *B25J 9/144* (2013.01); *F04B 35/04* (2013.01); *F04B 2015/081* (2013.01); *F04B 2015/0824* (2013.01); *F04B 41/02* (2013.01)

(58) Field of Classification Search
CPC ................................ B25J 9/0006; B25J 9/144
See application file for complete search history.

(56) References Cited

U.S. PATENT DOCUMENTS

| | | | |
|---|---|---|---|
| 2017/0059242 A1* | 3/2017 | Boyd ...................... | F04B 41/00 |
| 2018/0065429 A1* | 3/2018 | Richardson ............. | F04B 35/01 |
| 2023/0057294 A1* | 2/2023 | Park ........................ | A61H 3/00 |

FOREIGN PATENT DOCUMENTS

| | | |
|---|---|---|
| JP | 2002-174206 A | 6/2002 |
| KR | 10-2012-0105194 A | 9/2012 |
| KR | 10-1878283 B | 8/2018 |
| KR | 10-2022-0119889 A | 8/2022 |

* cited by examiner

*Primary Examiner* — Matthew Wiblin
(74) *Attorney, Agent, or Firm* — Bridgeway IP Law Group, PLLC; Jihun Kim

(57) ABSTRACT

A pneumatic energy generation device includes at least one pneumatic generation unit including a pneumatic supply member that supplies stored pneumatic energy to an actuator, a pneumatic generation member that generates the pneumatic energy by adjusting the pressure of the pneumatic supply member, and at least one pneumatic reinforcement unit including a liquid-gas chamber that receives a liquefied gas and a liquid chamber that receives a liquid, thereby selectively mixing the liquid into the liquefied gas according to the pressure of the pneumatic supply member to selectively gasify the liquefied gas and increasing the pneumatic energy while cooling the pneumatic generation member.

10 Claims, 11 Drawing Sheets

100

123

100

111

123

PNEUMATIC ENERGY GENERATION DEVICE

CROSS-REFERENCE TO RELATED APPLICATIONS

This application claims the priority of Korean Patent Application No. 10-2023-0196977 filed on Dec. 29, 2023, in the Korean Intellectual Property Office, the disclosure of which is incorporated herein by reference.

BACKGROUND

The disclosure relates to a pneumatic energy generation device, and more specifically, to a pneumatic energy generation device that effectively assists human muscle strength by providing either continuous pneumatic energy or explosive pneumatic energy to an actuator in response to the characteristic of human muscles operating with two energy supply plans.

In general, wearable robots are a means worn by people to support or assist the muscle strength of the human body, and most of them adopt a hydraulic device to exert great force.

In the previously filed Korean Patent Publication No. 10-2012-0105194 (Sep. 25, 2012), a wearable robot with improved weight, volume, noise, vibration, and energy efficiency is disclosed.

The wearable robot according to the above-mentioned related art is configured to supply hydraulic pressure to a hydraulic actuator such as a hydraulic cylinder that is connected to an upper leg part and a lower leg part, respectively, to assist leg movement. The wearable robot includes a hydraulic device, and the hydraulic device has a hydraulic pump and a flow amount control valve.

The hydraulic pump is installed in a supply flow path that connects an oil tank where operating fluid is stored and a hydraulic actuator. The hydraulic pump is connected to an oil tank where operating fluid is stored, and is configured to pressurize the operating fluid stored in the oil tank, and is driven by an electric motor. That is, the electric motor and the hydraulic pump function to pressurize the operating fluid and supply it to the hydraulic actuator. The hydraulic pump may be configured as a hydraulic pump connected to the electric motor and operating in one direction. The electric motor is controlled to operate by a control signal of a motor controller, and the motor controller receives a control signal of a main controller and outputs a corresponding control signal to the motor.

The flow amount control valve is installed in a discharge flow path, which is a passage that discharges hydraulic pressure by branching off from the supply flow path connecting the hydraulic actuator and the hydraulic pump. The flow amount control valve is controlled by the control signal of the valve controller, and the valve controller generates and outputs a signal for controlling an operation of the flow amount control valve according to the control signal output from the main controller. In this case, a pressure sensor is installed in the supply flow path that supplies operating oil to the hydraulic actuator, and a signal processor processes an output signal of the pressure sensor and transfers it to the main controller. In addition, a check valve is provided on the supply flow path between the hydraulic actuator and the hydraulic pump.

Since the above-mentioned related art is composed of relatively large components such as an oil tank, a hydraulic pump, and a hydraulic actuator, there was a problem that it was difficult for a user to withstand the weight of the oil tank, etc., and thus, when performing a separate task, it was difficult to concentrate on the task.

(Patent document 1) Republic of Korea Patent Publication No. 10-2012-0105194 (Sep. 25, 2012)

SUMMARY

An aspect of the disclosure is to provide a pneumatic energy generation device capable of effectively assisting human muscle strength in response to the characteristic that human muscles operate with two energy supply plans (anaerobic/aerobic metabolism), by operating only a pneumatic generation unit to supply low-output continuous pneumatic energy to an actuator or operating both a pneumatic generation unit and a pneumatic reinforcement unit to supply high-output explosive pneumatic energy to an actuator.

The aspect of the disclosure is not limited to that mentioned above, and other aspects not mentioned will be clearly understood by those skilled in the art from the description below.

The disclosure provides a pneumatic energy generation device, including: at least one pneumatic generation unit including a pneumatic supply member that supplies stored pneumatic energy to an actuator and a pneumatic generation member that generates the pneumatic energy by adjusting the pressure of the pneumatic supply member; and at least one pneumatic reinforcement unit including a liquid-gas chamber that receives a liquefied gas and a liquid chamber that receives a liquid, and selectively mixing the liquid into the liquefied gas according to the pressure of the pneumatic supply member to selectively gasify the liquefied gas, thereby increasing the pneumatic energy and cooling the pneumatic generation member.

In an embodiment of the disclosure, the pneumatic generation unit may further include: an upper housing that accommodates the pneumatic supply member and the pneumatic generation member; and a flow path adjustment valve that is connected between the liquid-gas chamber and the liquid chamber and is opened or closed according to the pressure of the pneumatic supply member to adjust the supply amount of the liquid supplied to the liquid-gas chamber.

In an embodiment of the disclosure, the pneumatic reinforcement unit may further include: a lower housing that is coupled to the lower portion of the upper housing and accommodating the liquid-gas chamber and the liquid chamber; and a check valve that is positioned at the inner upper side of the lower housing and connected between the pneumatic supply member and the liquid-gas chamber, wherein the check valve is closed in a direction from the pneumatic supply member to the liquid-gas chamber and opened in a direction from the liquid-gas chamber to the pneumatic supply member.

In an embodiment of the disclosure, the pneumatic reinforcement unit may further include a sensor including a temperature sensor and a pressure sensor, each connected to the pneumatic supply member to measure the temperature and pressure of the pneumatic supply member.

In an embodiment of the disclosure, the pneumatic energy may include continuous pneumatic energy for continuously supplying energy lower than preset energy and explosive pneumatic energy for instantaneously supplying energy higher than the preset energy, and the pneumatic energy generation device may further include a control unit that controls an operation of the pneumatic generation member so that the pneumatic supply member supplies one of the continuous pneumatic energy and the explosive pneumatic energy to the actuator.

In an embodiment of the disclosure, the pneumatic energy generation device may further include a control unit that controls an operation of the pneumatic generation member and the flow path adjustment valve so that a pressure amount of pressure generated in the pneumatic generation member and supplied to the pneumatic supply member and a gasification amount of the liquefied gas are maintained at a preset ratio.

In an embodiment of the disclosure, the pneumatic energy generation device may further include a control unit that has a control algorithm embedded therein to determine an operating state according to the temperature of the pneumatic supply member transferred from the temperature sensor, the pressure of the pneumatic supply member transferred from the pressure sensor, and a pre-input command, wherein the operating state includes a state in which the pressure generated from the pneumatic generation member is generated identically to the pre-designed pressure of the pneumatic generation member, is supplied to the pneumatic supply member, and is stored in the pneumatic supply member, a state in which the pneumatic generation member is overheated and the pressure according to the pre-input command is lower than the pre-designed pressure, a state in which the liquefied gas is consumed and does not exist inside the liquid-gas chamber, and a state in which a portion of the liquefied gas exists inside the liquid-gas chamber.

In an embodiment of the disclosure, the pneumatic generation member may include: a dual piston that is arranged at the inner upper side of the upper housing to communicate with the pneumatic supply member, and supplies air pressure generated through a linear reciprocating motion to the pneumatic supply member; and a motor that is connected to at least a portion of the dual piston and supplies rotational power to at least a portion of the dual piston to linearly reciprocate the dual piston.

In an embodiment of the disclosure, a seating member to which the lower end of the liquid-gas chamber is seated may be formed at the lower inner side of the lower housing, and one central portion of the lower housing may be opened so that the liquid-gas chamber is attachable to or detachable from the interior of the lower housing.

The disclosure has an effect of effectively assisting human muscle strength in response to the characteristic that human muscles operate with two energy supply plans (anaerobic/aerobic metabolism), by operating only a pneumatic generation unit to supply low-output continuous pneumatic energy to an actuator or operating both a pneumatic generation unit and a pneumatic reinforcement unit to supply high-output explosive pneumatic energy to an actuator.

The effects of the disclosure are not limited to the effects described above, and should be understood to include all effects that are inferable from the configuration of the disclosure described in the detailed description or claims of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
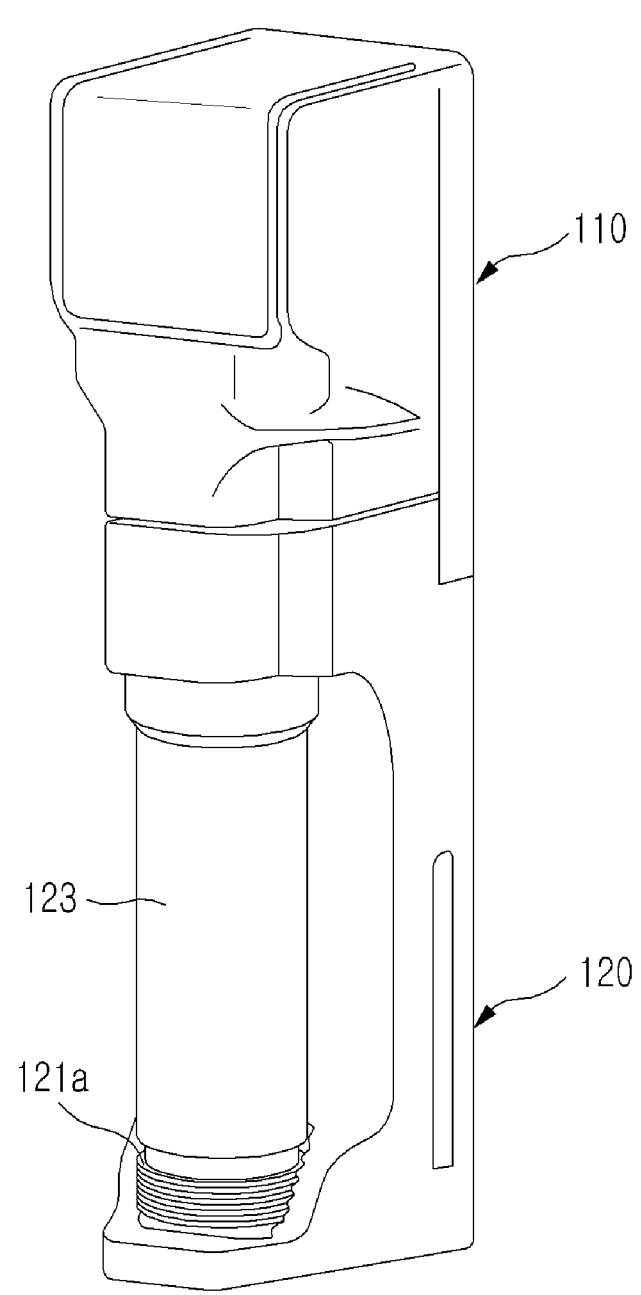
FIG. 1 is a perspective view from one direction showing a pneumatic energy generation device according to a first embodiment of the disclosure.

Hereinafter, the disclosure will be described with reference to the accompanying drawings. However, the disclosure may be implemented in various different forms, and therefore is not limited to the embodiments described herein. In addition, in order to clearly describe the disclosure in the drawings, parts that are not related to the description are omitted, and similar parts are given similar drawing reference numerals throughout the specification.

In the entire specification, when a part is said to be "connected (linked, contacted, coupled)" to another part, this includes not only the case where it is "directly connected" but also the case where it is "indirectly connected" with another member in between. In addition, when a part is said to "include" a certain component, this does not mean that other components are excluded unless otherwise specifically stated, but that other components may be additionally provided.

The terms used in this specification are used only to describe specific embodiments and are not intended to limit the disclosure. The singular expression includes the plural expression unless the context clearly indicates otherwise. In this specification, the terms "include" or "have" are intended to specify the presence of a feature, number, step, operation, component, part, or combination thereof described in the specification, but should be understood as not excluding in advance the possibility of the presence or addition of one or more other features, numbers, steps, operations, components, parts, or combinations thereof.

Hereinafter, embodiments of the disclosure will be described in detail with reference to the accompanying drawings.

1. First Embodiment

Hereinafter, a pneumatic energy generation device according to a first embodiment of the disclosure will be described with reference to FIGS. 1 to 8.

FIG. 1 is a perspective view from one direction showing a pneumatic energy generation device according to a first embodiment of the disclosure.

Referring to FIG. 1, a pneumatic energy generation device 100 according to a first embodiment of the disclosure is a pneumatic energy generation device 100 based on liquefied gas for operating a biomimetic pneumatic artificial muscle, and includes at least one pneumatic generation unit 110, at least one pneumatic reinforcement unit 120, and a control unit 130.

Here, the liquefied gas may include any gas that is liquefiable, and the liquefied gas in the disclosure will be described as being liquefied nitrogen ($N_2$).

Figure 2:
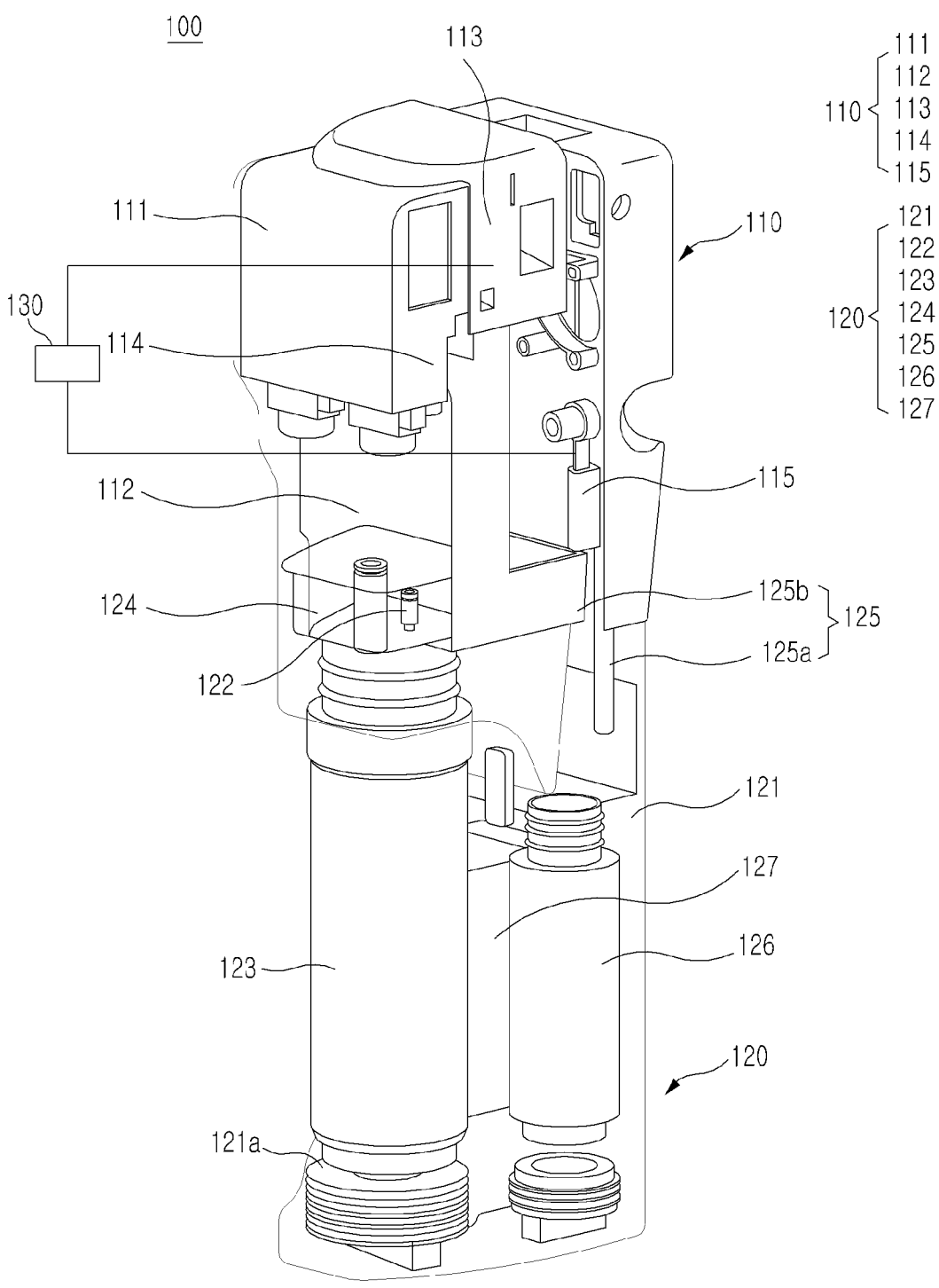
FIG. 2 is a perspective view from one direction showing a detailed configuration equipped in a pneumatic energy generation device according to a first embodiment of the disclosure.
Figure 3:
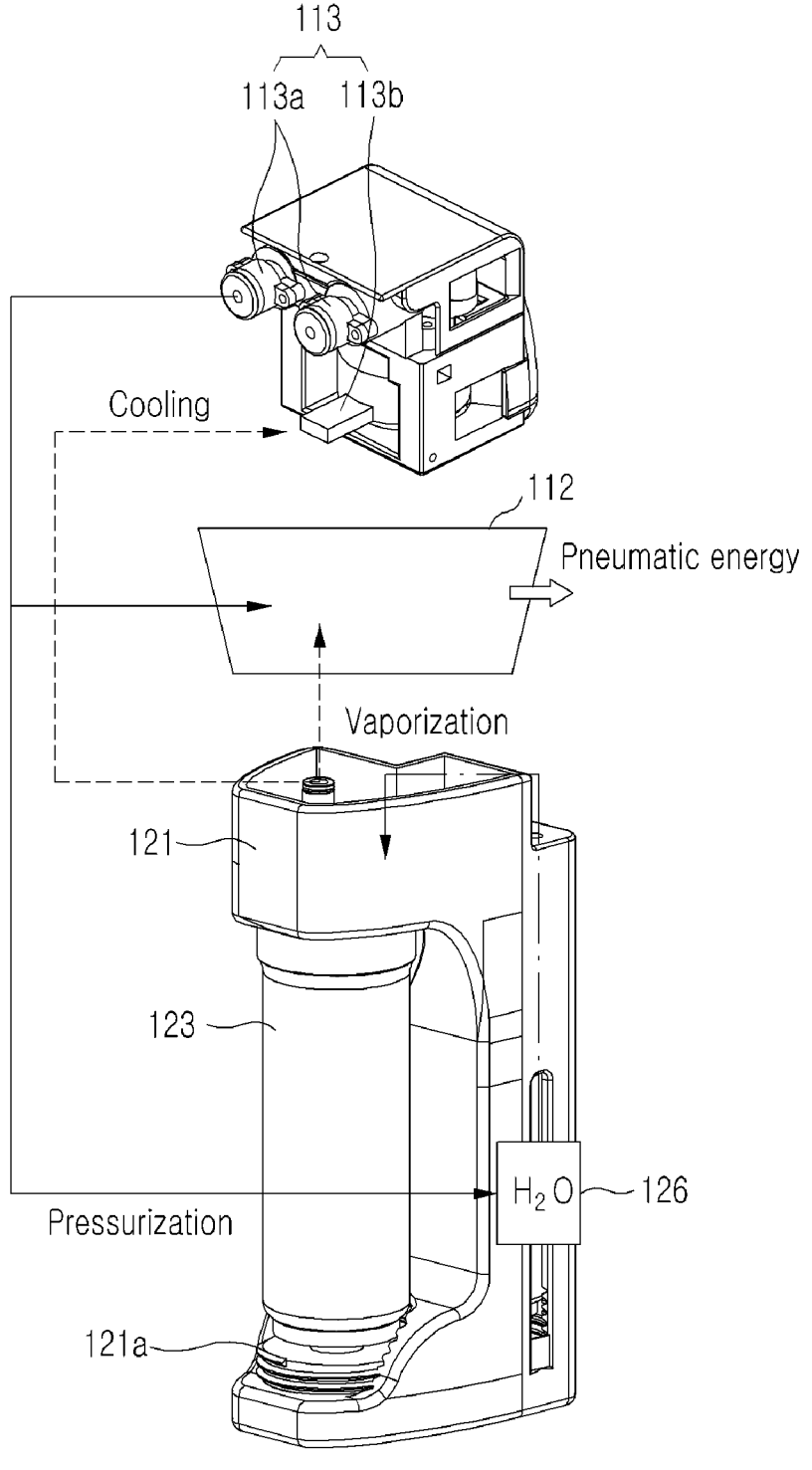
FIG. 3 is a conceptual view showing a process in which a pneumatic energy generation device according to a first embodiment of the disclosure generates pneumatic energy.

FIG. 2 is a perspective view from one direction showing a detailed configuration equipped in a pneumatic energy generation device according to a first embodiment of the disclosure. FIG. 3 is a conceptual view showing a process in which a pneumatic energy generation device according to a first embodiment of the disclosure generates pneumatic energy.

Referring to FIGS. 2 and 3, the pneumatic generation unit 110 includes an upper housing 111, a pneumatic supply member 112, a pneumatic generation member 113, a safety valve 114, and a flow path adjustment valve 115.

The upper housing 111 has an internal space formed to accommodate the pneumatic supply member 112 and the pneumatic generation member 113.

In addition, a lower housing 121 to be described later is coupled to the lower portion of the upper housing 111.

The pneumatic supply member 112 (reservoir) has a hollow shape with an empty interior and supplies stored pneumatic energy to an actuator 10.

Specifically, the pneumatic supply member 112 communicates with the pneumatic generation member 113 and is supplied with pressure generated from the pneumatic generation member 113. The pneumatic supply member 112 stores pneumatic energy due to pressure applied inside and supplies it to the actuator 10 to operate the actuator 10.

The pneumatic generation member 113 adjusts the pressure of the pneumatic supply member 112 to generate pneumatic energy.

The pneumatic generation member 113 therefor includes a dual piston 113a and a motor 113b.

The dual piston 113a is arranged at the inner upper side of the upper housing 111 and communicates with the pneumatic supply member 112, and supplies pneumatic pressure generated through a linear reciprocating motion to the pneumatic supply member.

Specifically, the dual piston 113a may include a rotating plate connected to a motor shaft of the motor 113b and rotating, a connecting rod having one side linked to the rotating plate, a piston linked to the other side of the connecting rod and performing a linear reciprocating motion, and a guide member formed to surround the piston and guiding the linear reciprocating motion of the piston.

The motor 113b is connected to at least a portion of the dual piston 113a and supplies rotational power to at least a portion of the dual piston 113a to perform a linear reciprocating motion of the dual piston 113a.

The safety valve 114 is positioned inside the upper housing 111 and communicates with the pneumatic supply member 112.

In addition, the safety valve 114 is normally closed, but when the pressure of the pneumatic supply member 112 exceeds a preset safety pressure range, the safety valve opens to discharge a portion of air in the pneumatic supply member 112, thereby lowering the pressure of the pneumatic supply member 112, thereby preventing the pneumatic supply member 112 from bursting due to pressure.

The flow path adjustment valve 115 is connected between the liquid-gas chamber 123 and the liquid chamber 126, and is opened or closed according to the pressure of the pneumatic supply member 112 to adjust the supply amount of liquid supplied to the liquid-gas chamber 123.

For example, the flow path adjustment valve 115 may be a solenoid valve, but is not limited thereto, and any valve (for example, a manual valve or the like) that performs a function of blocking or opening the flow of a flow path may be used.

Here, the liquid may be liquid including water, antifreeze, etc.

The pneumatic reinforcement unit 120 selectively mixes liquid with liquefied gas according to the pressure of the pneumatic supply member 112 and selectively gasifies the liquefied gas, thereby increasing the pneumatic energy and cooling the pneumatic generation member 113.

Here, the main function of the pneumatic reinforcement unit 120 is to quickly generate high pressure in the pneumatic supply member 112, and the secondary function of the pneumatic reinforcement unit 120 is to cool the pneumatic generation member 113b.

Specifically, if the pneumatic generation member 113b is repeatedly operated, overheating may occur in the pneumatic generation member 113b, which may deteriorate the performance.

The reason for the deterioration in performance is that as the temperature increases, the magnetic flux density of the motor decreases and thus the output decreases.

To cope with such performance degradation, the pneumatic reinforcement unit 120 cools the pneumatic generation member 113b by injecting low-temperature nitrogen gas that has been gasified from liquefied gas. In addition, the pneumatic reinforcement unit 120 gasifies the liquefied gas of the pneumatic reinforcement unit 120 and transfers it to the pneumatic supply member 112 in order to inject low-temperature nitrogen gas to the pneumatic generation member 113b. In addition, the pneumatic reinforcement unit 120 continues to attempt gasification beyond a preset safety pressure range of the safety valve 114. Thereafter, when discharged through the safety valve 114, the low-temperature nitrogen gas directly contacts the overheated pneumatic generation member 113b positioned nearby, thereby cooling the overheated pneumatic generation member 113b.

Referring to FIGS. 2 and 3, the pneumatic reinforcement unit 120 includes a lower housing 121, a fitting member 122, a liquid-gas chamber 123, a check valve 124, a sensor 125, a liquid chamber 126, and a battery 127.

The lower housing 121 is coupled to the lower portion of the upper housing 111 and has an internal space formed to accommodate the liquid-gas chamber 123 and the liquid chamber 126.

In addition, a seating member 121a is formed on the lower portion of the lower housing 121 so that the lower portion of the liquid-gas chamber 123 is seated.

In addition, as shown in FIG. 2, a central portion of one side of the lower housing 121 is opened so that the liquid-gas chamber 123 is attachable to or detachable from the interior of the lower housing 121.

Accordingly, the liquid-gas chamber 123 coupled to the inside of the lower housing 121 is at least partially exposed to the outside.

The fitting member 122 is positioned at the inner upper side of the lower housing 121.

In addition, the fitting member 122 makes the pneumatic supply member 112 communicate with the liquid-gas chamber 123.

Figure 4A:
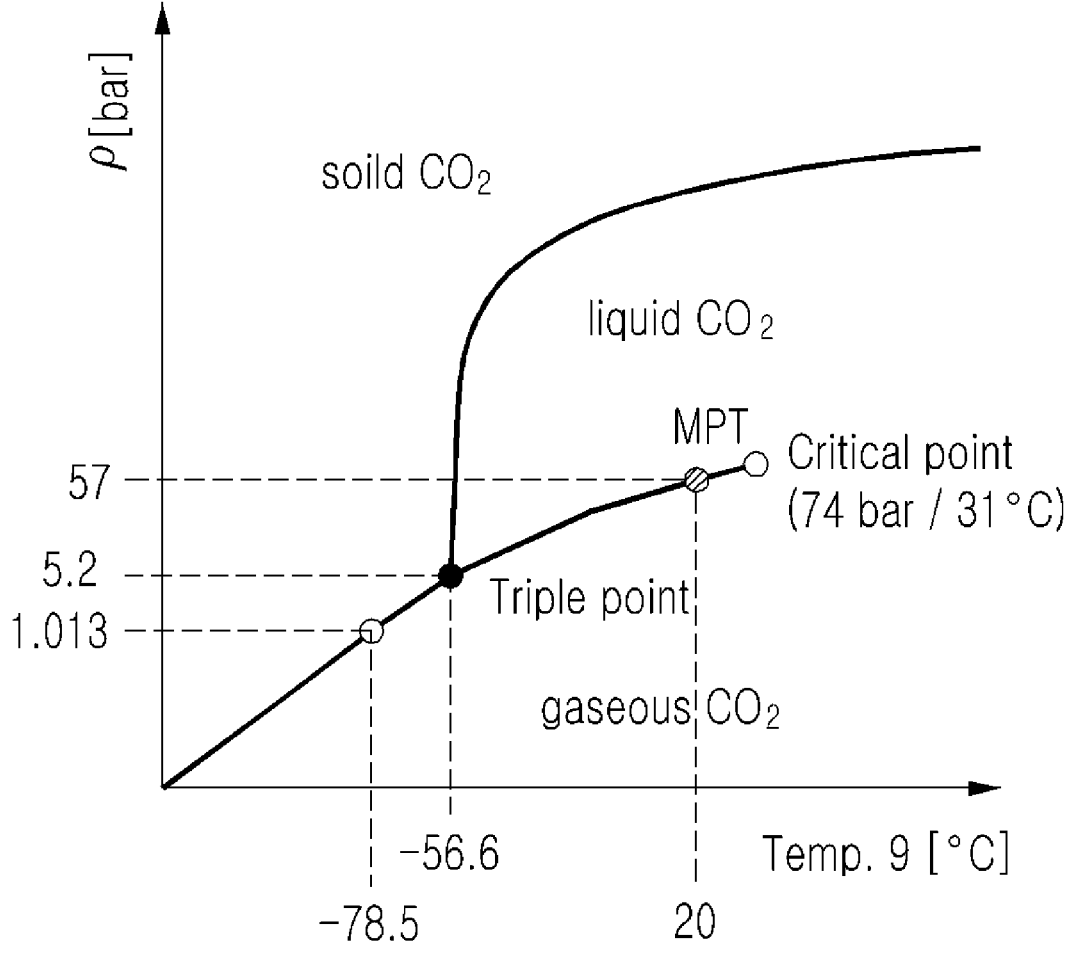
FIGS. 4A and 4B are each a graph showing a pressure curve according to the temperature of carbon dioxide used in the related art and nitrogen used in a pneumatic energy generation device according to first and second embodiments of the disclosure.
Figure 4B:
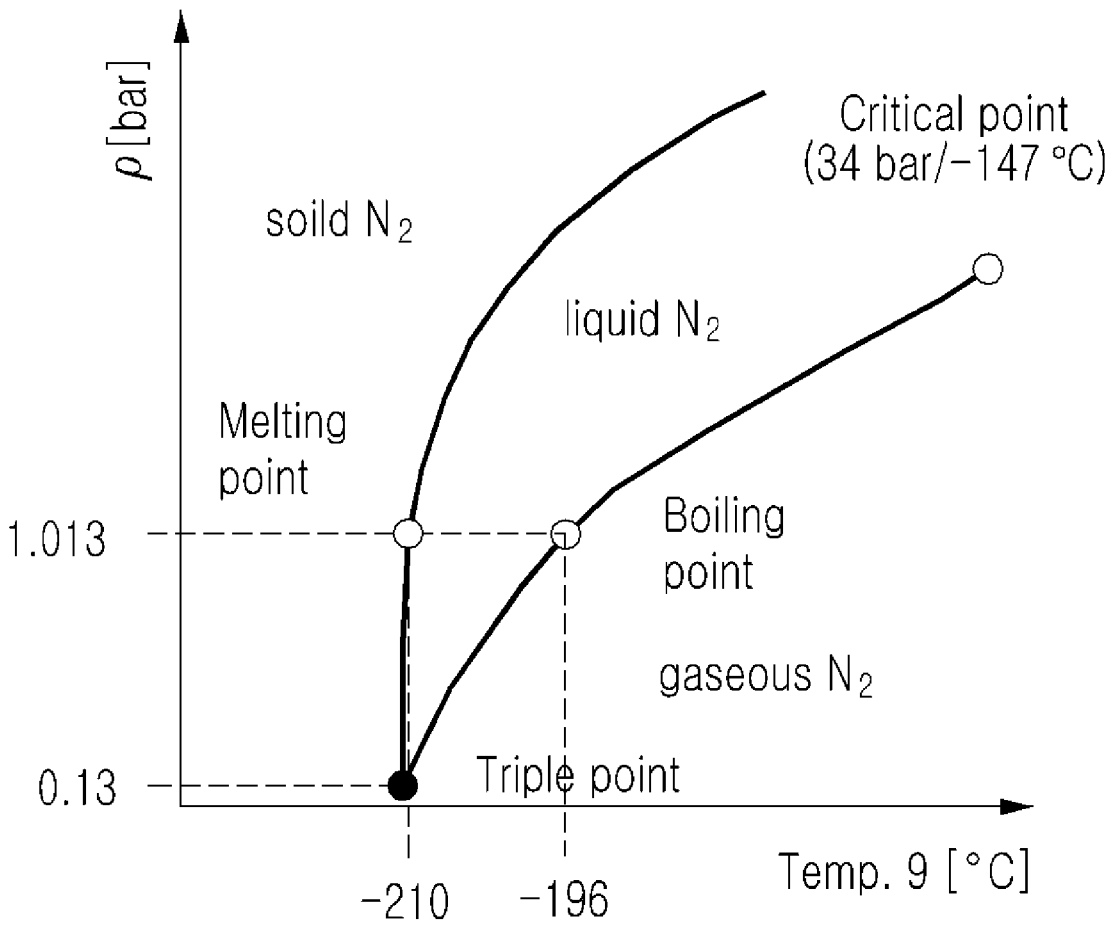
Figure 5:
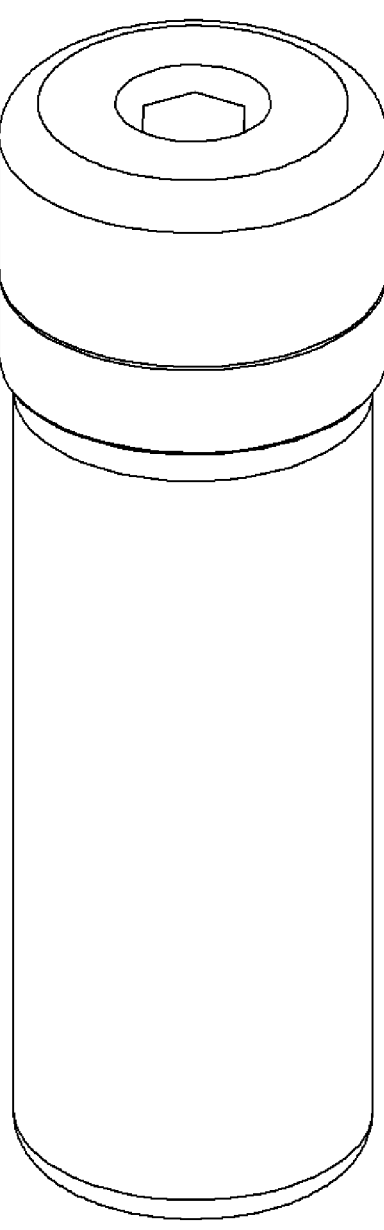
FIG. 5 is a perspective view from one direction showing a liquid-gas chamber equipped in a pneumatic energy generation device according to a first embodiment of the disclosure.

FIGS. 4A and 4B are each a graph showing a pressure curve according to the temperature of carbon dioxide used in the related art and nitrogen used in a pneumatic energy generation device according to first and second embodiments of the disclosure. FIG. 5 is a perspective view from one direction showing a liquid-gas chamber equipped in a pneumatic energy generation device according to a first embodiment of the disclosure.

Referring to FIG. 5, the liquid-gas chamber 123 has an internal space formed to accommodate liquefied gas.

Specifically, the liquid-gas chamber 123 may have a cylindrical shape, and the upper portion of the liquid-gas chamber 123 communicates with the fitting member 122.

In the disclosure, liquid nitrogen is used to generate pneumatic energy, but in the related art, carbon dioxide was used.

When carbon dioxide ($CO_2$) is used, carbon dioxide ($CO_2$) existing at room temperature and atmospheric pressure is captured and then the pressure is lowered to make it into a liquid state.

On the other hand, in order to gasify carbon dioxide, carbon dioxide in a liquid state is open to conditions of room temperature and atmospheric pressure.

Referring to FIG. 4A, since carbon dioxide is liquefied at relatively high pressure, an extremely solid, thick, and heavy container, such as a high-pressure air tank, is required to store liquefied carbon dioxide.

If a lightweight compact container such as a bicycle carbon dioxide cartridge or soda water cartridge is used, it is not possible to hold a large amount of air.

Meanwhile, referring to FIG. 4B, nitrogen ($N_2$) is more affected by temperature than by pressure when liquefied compared to carbon dioxide.

Generally, liquid nitrogen ($N_2$) is an economical, environmentally friendly, and chemically stable substance as a byproduct generated during a process of obtaining liquid oxygen.

In particular, this may be used as a promising pneumatic energy source that may supply the explosively high pressure and flow amount due to its characteristic that the volume may expand 600 to 700 times when phase-changing from a liquid state to a gaseous state at room temperature and atmospheric pressure.

In addition, since the liquefied gas maintains a liquid state even at a very low temperature of −200 degrees Celsius, liquid nitrogen may be gasified by increasing the surrounding temperature.

On the other hand, in order to store liquefied gas in a liquid state for a long time, an insulating container that is isolable from the surrounding room temperature, which is a relatively very hot temperature, is required, and accordingly, the liquid-gas chamber 123 is preferably made of a material capable of insulation.

The liquid-gas chamber 123 for storing liquefied gas does not need to withstand high pressure, and rather has a more important feature of insulation capability.

It is possible to manufacture such a liquid-gas chamber 123 relatively more compactly and lightly, and thus there is an advantage in that it is possible to secure a large capacity with a compact and light weight compared to other carbon dioxide tanks or high-pressure air tanks.

Specifically, the liquid-gas chamber 123 may be formed in a structure similar to a thermos bottle, and such a liquid-gas chamber 123 has a vacuum layer between outer and inner walls, which limits the heat transfer scheme to radiation and has an insulation function.

The check valve 124 is positioned on the inner upper side of the lower housing 121 and is connected between the pneumatic supply member 112 and the liquid-gas chamber 123.

Specifically, the check valve 124 is closed in a direction from the pneumatic supply member 112 to the liquid-gas chamber 123, and opened in a direction from the liquid-gas chamber 123 to the pneumatic supply member 112.

Figure 6:
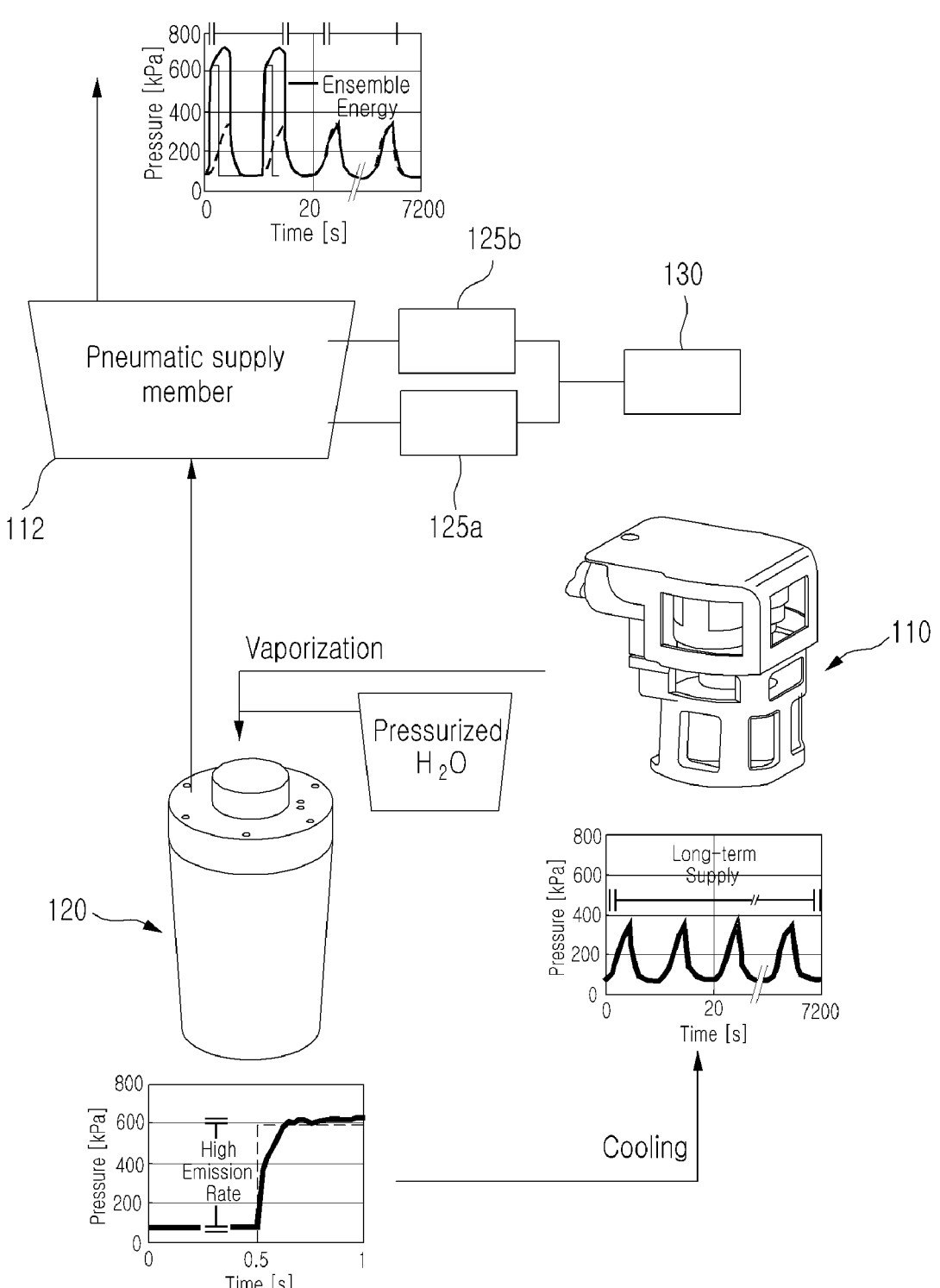
FIG. 6 is a diagram showing pressure according to time, when a pneumatic energy generation device according to first and second embodiments of the disclosure generates continuous pneumatic energy and explosive pneumatic energy and supplies the same to an actuator.

FIG. 6 is a diagram showing pressure according to time, when a pneumatic energy generation device according to first and second embodiments of the disclosure generates continuous pneumatic energy and explosive pneumatic energy and supplies the same to an actuator.

Referring to FIG. 6, the sensor 125 includes a temperature sensor 125a and a pressure sensor 125b that are respectively connected to the pneumatic supply member 112 and measure the temperature and pressure of the pneumatic supply member 112.

The temperature sensor 125a is respectively connected to the pneumatic supply member 112 and measures the temperature of the pneumatic supply member 112.

The temperature sensor 125a transfers the measured temperature of the pneumatic supply member 112 to the control unit 130.

The pressure sensor 125b is respectively connected to the pneumatic supply member 112 and measures the pressure of the pneumatic supply member 112.

The pressure sensor 125b transfers the measured pressure of the pneumatic supply member 112 to the control unit 130.

The liquid chamber 126 has a hollow shape with an interior that is empty to accommodate liquid.

In addition, the liquid chamber 126 may share the same space as the pneumatic supply member 112 (reservoir).

In addition, the liquid chamber 126 is arranged inside the lower housing 121 to be adjacent to the liquid-gas chamber 123.

The liquid chamber 126 supplies liquid to the interior of the liquid-gas chamber 123 due to the pressure difference between the liquid chamber 126 and the liquid-gas chamber 123 that changes depending on whether the flow path adjustment valve 115 is opened or closed.

The battery 127 is positioned inside the lower housing 121 to be adjacent to the liquid-gas chamber 123 and the liquid chamber 126.

The battery 127 supplies power to the pneumatic generation member 113, safety valve 114, flow path adjustment valve 115, check valve 124, sensor 125, and control unit 130.

Figure 7:
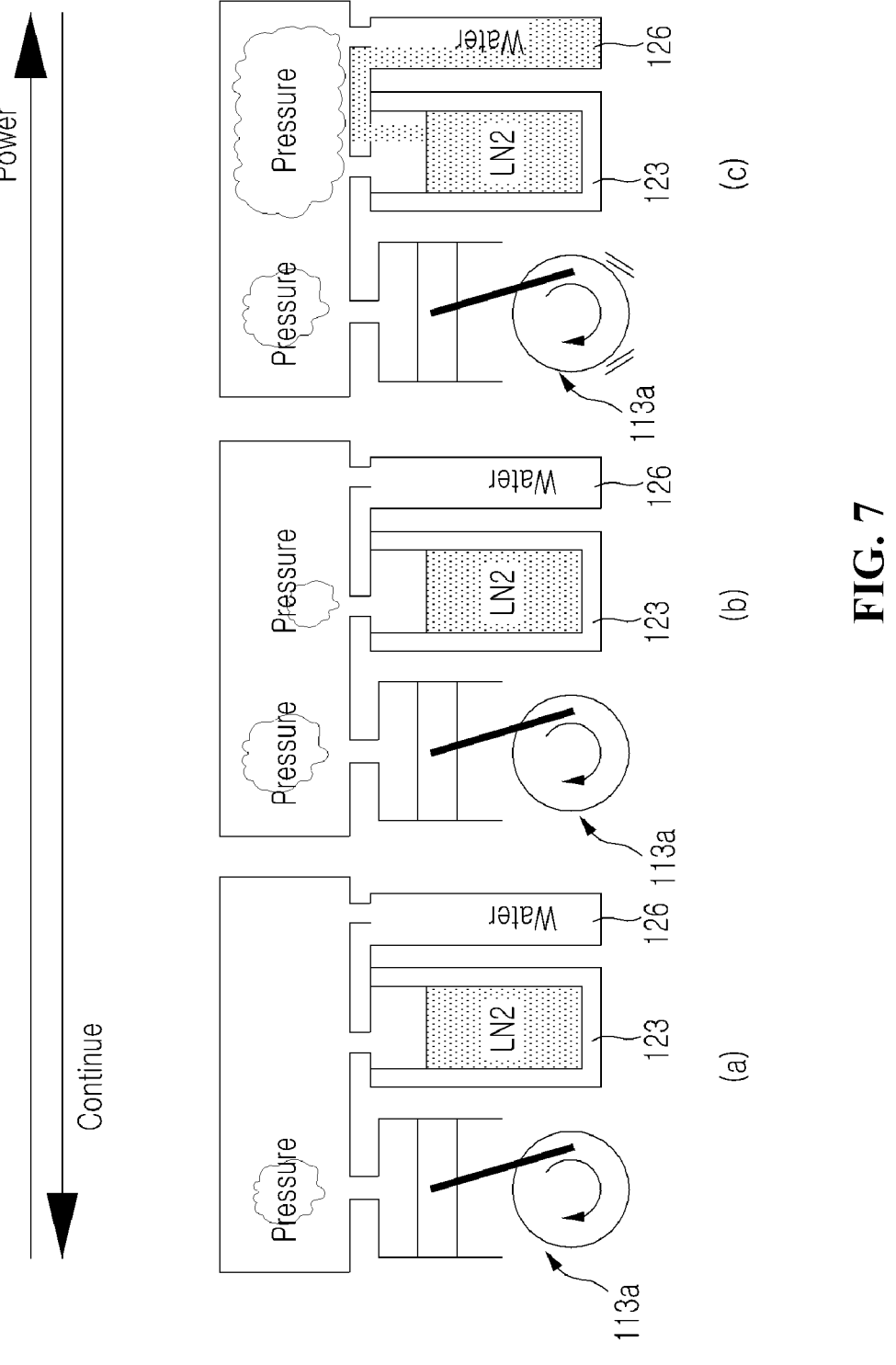
FIG. 7 is a conceptual view ((a), (b), or (c)) showing a pneumatic energy generation device according to first and second embodiments of the disclosure generating pneumatic energy by adjusting pressure and the amount of liquid supplied.

FIG. 7 is a conceptual view ((a), (b), or (c)) showing a pneumatic energy generation device according to first and second embodiments of the disclosure generating pneumatic energy by adjusting pressure and the amount of liquid supplied.

The control unit 130 controls an operation of the pneumatic generation member 113 so that the pneumatic supply member 112 supplies one of continuous pneumatic energy and explosive pneumatic energy to the actuator 10.

Here, pneumatic energy may include continuous pneumatic energy for continuously supplying energy lower than preset energy and explosive pneumatic energy for instantaneously supplying energy higher than the preset energy.

Specifically, as shown in (a) of FIG. 7, if only the pneumatic generation member 113 operates, the continuous pneumatic energy may be provided by continuously supplying low pressure.

Meanwhile, when the actuator 10 requires relatively high output, the pressure generated from the pneumatic generation member 113 alone cannot provide sufficient pneumatic energy, and thus additional explosive pneumatic energy must be stored in the pneumatic supply member 112 (reservoir) through the pneumatic reinforcement unit 120.

Here, the explosive pneumatic energy includes first explosive pneumatic energy and second explosive pneumatic energy, and the second explosive pneumatic energy has a higher output than the first explosive pneumatic energy.

Accordingly, as shown in (b) of FIG. 7, when the pneumatic supply member 112 is initially pressurized by the pneumatic generation member 113 and the solenoid valve 115b is opened so that the liquid contained in the liquid chamber 126 is injected into the liquefied gas chamber 123, the liquid may be injected into the liquid-gas chamber 123 little by little.

More specifically, the liquid contained in the liquid chamber 126 is pushed into the interior of the liquid-gas chamber 123 due to the property of achieving pressure equilibrium according to the pressure difference between the liquid-gas chamber 123 with relatively low pressure and the pneumatic supply member 112 (reservoir).

The liquid-gas chamber 123 has two inlets as being connected to the check valve 124 and the flow path adjustment valve 115; therefore, when the flow path adjustment valve 115 is closed, a pressure difference occurs with the pneumatic supply member 112 (reservoir), whereas when the flow path adjustment valve 115 is opened, the pressure equilibrium is achieved.

Here, as described above, the check valve 124 is closed in a direction from the pneumatic supply member 112 (reservoir) to the liquid-gas chamber 123, and is open in a direction from the liquid-gas chamber 123 to the pneumatic supply member 112 (reservoir).

As shown in (b) of FIG. 7, if, at the time of supplying the first explosive pneumatic energy, the pneumatic supply member 112 (reservoir) is first filled with the appropriately low pressure using the pneumatic generation member 113 and the flow path adjustment valve 115 is opened or closed at short time intervals to inject liquid, the liquid may drop little by little into the liquid-gas chamber 123 to generate an appropriate amount of gasification, and through this, it is possible to generate the first explosive pneumatic energy required for the actuator 10.

Meanwhile, referring to (c) of FIG. 7, in order to transfer the high-power second explosive pneumatic energy to the actuator 10, the pressure of the pneumatic supply member 112 (reservoir) is initially increased to the maximum that the pneumatic generation member 113 can generate, and then the flow path adjustment valve 115 is opened sufficiently to allow the liquid to be injected into the liquid-gas chamber 123 at high pressure. As the liquid is injected at high pressure, the liquefied gas in the liquid-gas chamber 123 is rapidly gasified and transferred to the pneumatic supply member 112 (reservoir) through the check valve 124.

Accordingly, a large amount of air is generated in an instant, and the pressure of the pneumatic supply member 112 (reservoir) rapidly increases.

In addition, the control unit 130 controls an operation of the pneumatic generation member 113 and the flow path adjustment valve 115 so that a pressure amount of the pressure generated in the pneumatic generation member 113 and supplied to the pneumatic supply member 112 and a gasification amount of the liquefied gas are maintained at a preset ratio.

In addition, the control unit 130 may have a control algorithm embedded therein to determine an operating state according to the temperature of the pneumatic supply member 112 transferred from the temperature sensor 125a, the pressure of the pneumatic supply member 112 transferred from the pressure sensor 125b, and a pre-input command.

Here, the operating state may include 1) a state in which the pressure generated from the pneumatic generation member 113 is generated identically to the pre-designed pressure of the pneumatic generation member 113, is supplied to the pneumatic supply member 112, and is stored in the pneumatic supply member 112, 2) a state in which the pneumatic generation member 113 is overheated and the pressure according to the pre-input command is lower than the pre-designed pressure, 3) a state in which the liquefied gas is consumed and does not exist inside the liquid-gas chamber 123, and 4) a state in which a portion of the liquefied gas exists inside the liquid-gas chamber 123.

Hereinafter, an operation of the pneumatic energy generation device according to the first embodiment of the disclosure will be described with reference to FIGS. 3, 6, and 8.

FIG. 3 illustrates a process of generating pneumatic energy to be provided to the actuator 10 through the pneumatic energy generation device 100 according to the first embodiment of the disclosure, wherein as shown in FIG. 3, pneumatic energy is generated through the pneumatic generation unit 110 and the pneumatic reinforcement unit 120 that have a mutually complementary relationship.

Specifically, the pneumatic generation unit 110 contributes to compressing liquid to operate the pneumatic reinforcement unit 120 at high pressure, and the pneumatic reinforcement unit 120 contributes to cooling so as to allow the pneumatic generation unit 110 to continuously make certain performance.

The pneumatic energy generated by the pneumatic generation unit 110 and the pneumatic reinforcement unit 120 is stored together in the pneumatic supply member 112 (reservoir) and transferred to the actuator 10.

Referring to FIG. 6, the pneumatic generation unit 110 may continuously supply sufficient energy for a long time to assist the actuator with a low range of motion intensity.

Specifically, in the graph shown in the upper portion of FIG. 6, the pressure continuously decreases with a peak value of 350 kPa.

The reason for the above is that when the actuator 10 continuously uses the stored pressure of the pneumatic supply member 112 (reservoir), the volume of air stored in the pneumatic supply member 112 (reservoir) is instantaneously transferred to the actuator 10, causing a pressure fluctuation, and the pneumatic generation member 113 operates again to maintain 350 kPa.

The pneumatic reinforcement unit 120 may generate explosive high-output input power in an instant; therefore, even if the actuator 10 is driven, a large pressure fluctuation does not occur in the pneumatic supply member 112 (reservoir).

If the pneumatic generation unit 110 and the pneumatic reinforcement unit 120 are used simultaneously, the pneumatic energy generated by each of the pneumatic generation unit 110 and the pneumatic reinforcement unit 120 is stored together in the pneumatic supply member 112 (reservoir), and high-output pneumatic energy may be instantaneously provided by the pneumatic reinforcement unit 120, and at the same time, pressure energy may be continuously provided by the pneumatic generation unit 110.

Figure 8:
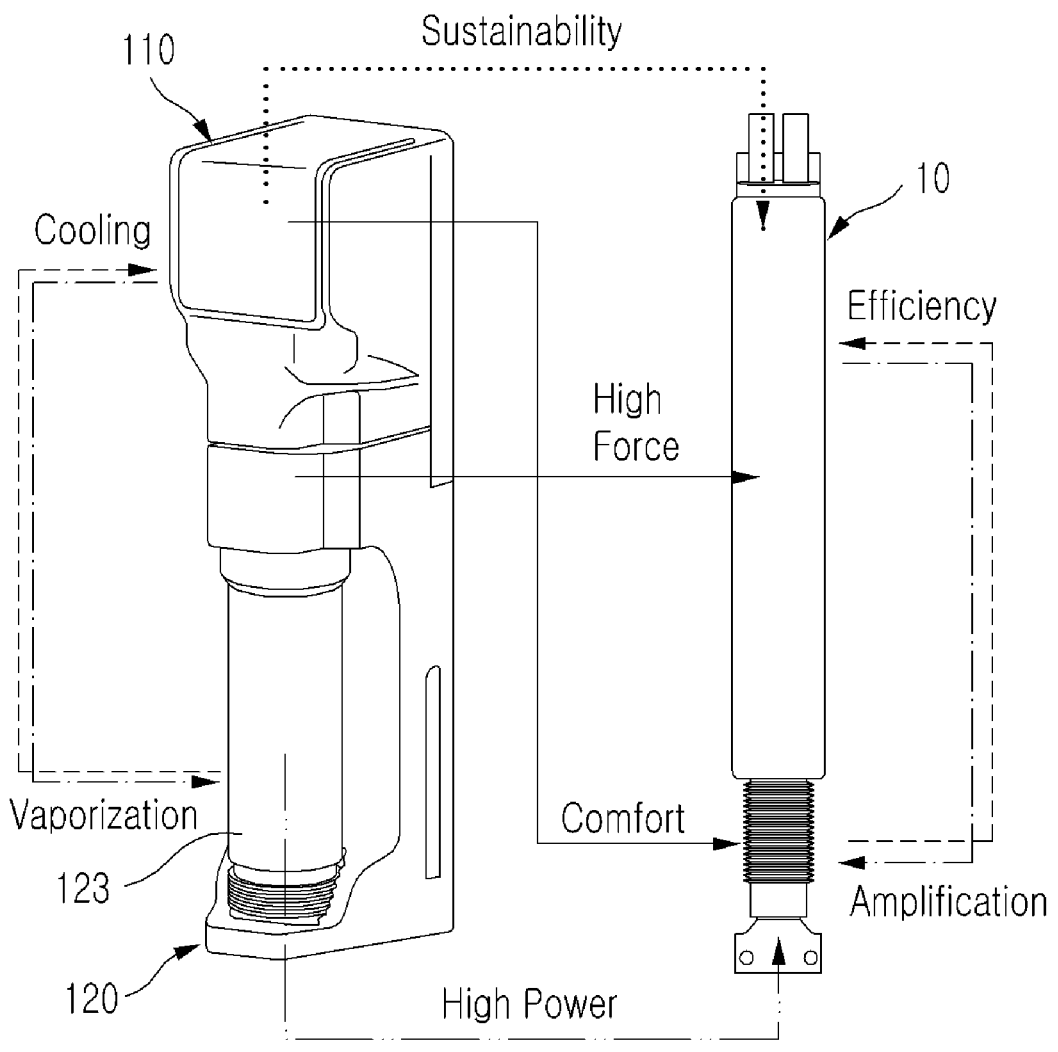
FIG. 8 is a conceptual view showing a process in which a pneumatic energy generation device according to a first embodiment of the disclosure transfers continuous pneumatic energy and explosive pneumatic energy to an actuator by adjusting the pressure of a pneumatic supply member.

FIG. 8 is a conceptual view showing a process in which a pneumatic energy generation device according to a first embodiment of the disclosure transfers continuous pneumatic energy and explosive pneumatic energy to an actuator by adjusting the pressure of a pneumatic supply member.

Referring to FIG. 8, when the pressure of the pneumatic supply member 112 increases by the pneumatic generation member 113, the flow path adjustment valve 115 is opened, and the liquid contained in the liquid chamber 126 is supplied to the interior of the liquid-gas chamber 123. As a result, liquid nitrogen gasifies and vaporizes, and as the air that has become cold due to the gasification process is supplied to the pneumatic supply member 112, the pneumatic supply member 112 and the adjacent motor 113*b* are cooled.

Referring to FIG. 8, the disclosure may continuously supply low pressure energy sustainability by operating only the pneumatic generation unit 110, and may supply low pneumatic energy to the actuator 10 continuously and at the same time high pneumatic energy (high power) instantaneously to the actuator 10 by operating the pneumatic generating unit 110 and the pneumatic reinforcing unit 120 simultaneously, thereby enabling the actuator 10 to continuously produce output and instantaneously produce high output amplification.

2. Second Embodiment

Hereinafter, a pneumatic energy generation device according to a second embodiment of the disclosure will be described with reference to FIGS. 1 to 10.

Figure 9:
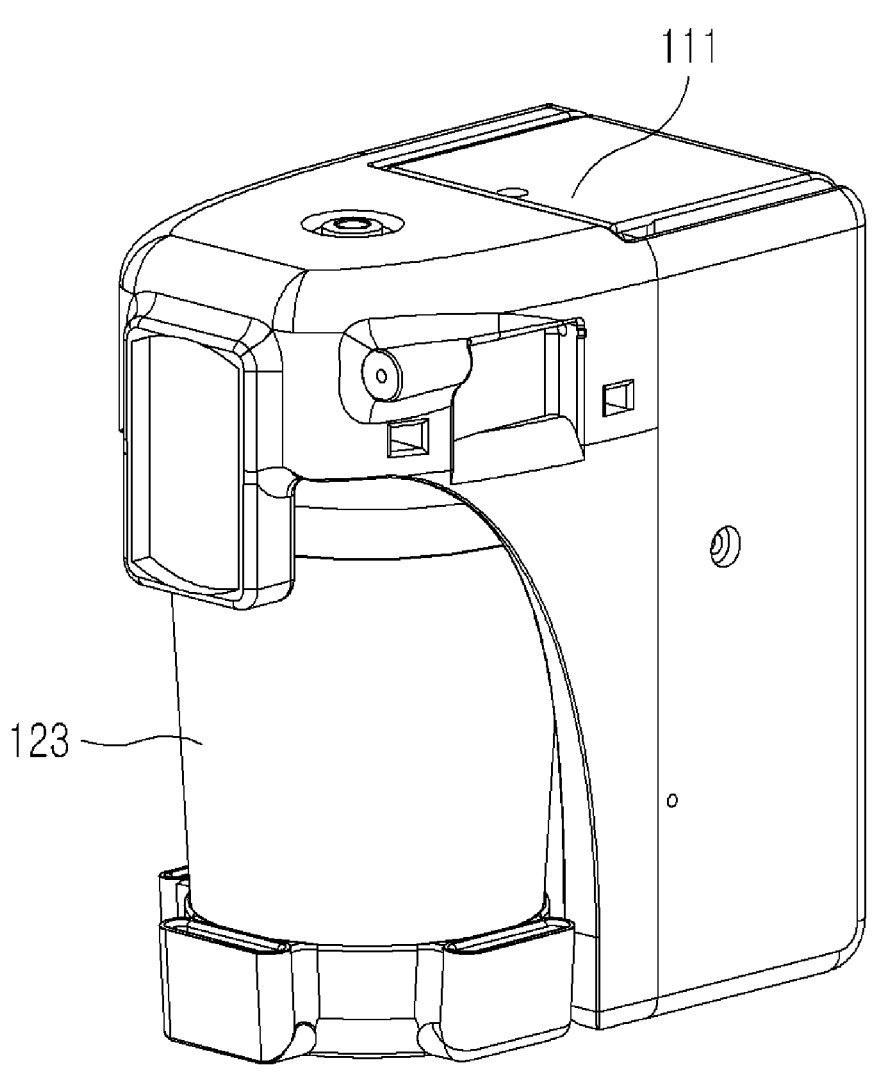
FIG. 9 and FIG. 10 are each a perspective view from one direction showing a pneumatic energy generation device according to a second embodiment of the disclosure.
Figure 10:
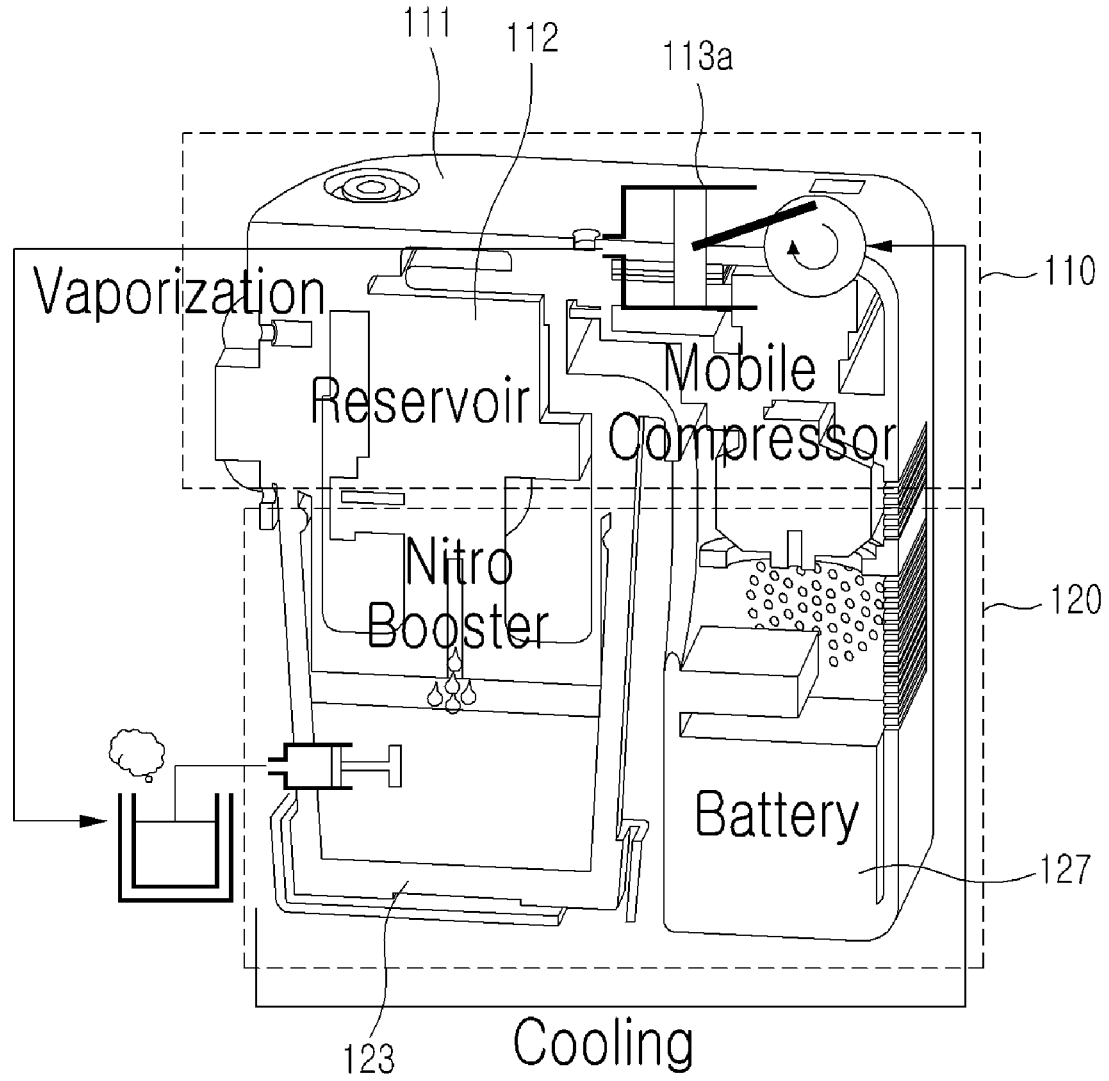

FIG. 9 and FIG. 10 are each a perspective view from one direction showing a pneumatic energy generation device according to a second embodiment of the disclosure.

Referring to FIGS. 9 and 10, a pneumatic energy generation device 100 according to a second embodiment of the disclosure includes at least one pneumatic generation unit 110, at least one pneumatic reinforcement unit 120, and a control unit 130.

Here, the pneumatic generation unit 110, the pneumatic reinforcement unit 120, and the control unit 130 provided in the pneumatic energy generation device 100 according to the second embodiment of the disclosure are the same as those of the first embodiment except for the position; therefore, for a detailed description thereof, the above would be referred to.

In addition, the detailed components of the pneumatic generation unit 110 and the pneumatic reinforcement unit 120 provided in the pneumatic energy generation device 100 according to the second embodiment of the disclosure are also the same as those of the first embodiment; therefore, for a detailed description thereof, the above would be referred to.

The pneumatic energy generation device 100 according to the second embodiment of the disclosure is configured in a form in which the width is widened instead of the height reduced, unlike the first embodiment that extends in the vertical direction, and thus has an advantage of being usable more compactly than the first embodiment.

The description of the disclosure is for illustrative purposes, and those skilled in the art will understand that it can be easily modified into other specific forms without changing the technical idea or essential features of the disclosure. Therefore, the embodiments described above should be understood as being exemplary in all respects and not limiting. For example, each component described as a single type may be implemented in a distributed manner, and likewise, components described as distributed may be implemented in a combined form.

The scope of the disclosure is indicated by the following claims, and all changes or modifications derived from the meaning and scope of the claims and their equivalent concepts should be interpreted as being included in the scope of the disclosure.

EXPLANATION OF REFERENCE NUMERALS

100: pneumatic energy generation device
110: pneumatic generation unit
111: upper housing
112: pneumatic supply member
113: pneumatic generation member
113*a*: dual piston
113*b*: motor
114: safety valve
115: flow path adjustment valve
120: pneumatic reinforcement unit
121: lower housing
121*a*: seating member
122: fitting member
123: liquid-gas chamber
124: check valve
125: sensor
125*a*: temperature sensor
125*b*: pressure sensor
126: liquid chamber
127: battery

What is claimed is:

1. A pneumatic energy generation device, comprising:
 a pneumatic generation unit comprising a pneumatic supply member configured to supply a pneumatic energy to an actuator and a pneumatic generation member configured to generate the pneumatic energy by adjusting a pressure of the pneumatic supply member; and
 a pneumatic reinforcement unit comprising a liquid-gas chamber configured to accommodate a liquefied gas and a liquid chamber configured to accommodate a liquid fluid,
 wherein the pneumatic reinforcement unit is configured to selectively mix the liquid into the liquefied gas according to the pressure of the pneumatic supply member, thereby selectively gasifying the liquefied gas and increasing the pneumatic energy while cooling the pneumatic generation member,
 wherein the pneumatic generation unit further includes an upper housing configured to accommodate the pneumatic supply member and the pneumatic generation member,
 wherein the pneumatic reinforcement unit further includes:
 a lower housing coupled to a lower portion of the upper housing and configured to accommodate the liquid-gas chamber and the liquid chamber; and a check valve positioned at an upper inside of the lower housing and connected between the pneumatic supply member and the liquid-gas chamber, wherein the check valve is configured to be closed in a first direction from the pneumatic supply member to the liquid-gas chamber and configured to be opened in a second direction from the liquid-gas chamber to the pneumatic supply member.

2. The pneumatic energy generation device of claim 1, wherein the pneumatic generation unit further comprises:

a flow path adjustment valve that is connected between the liquid-gas chamber and the liquid chamber and configured to be opened or closed according to the pressure of the pneumatic supply member to adjust a supply amount of the liquid supplied to the liquid-gas chamber.

3. The pneumatic energy generation device of claim 2, further comprising a controller configured to control an operation of the pneumatic generation member and the flow path adjustment valve to maintain a preset ratio between a pressure amount generated in the pneumatic generation member and supplied to the pneumatic supply member and a gasification amount of the liquefied gas.

4. The pneumatic energy generation device of claim 2, wherein the pneumatic generation member comprises:

a dual piston positioned at an upper inside of the upper housing to communicate with the pneumatic supply member, and configured to supply air pressure generated through a linear reciprocating motion to the pneumatic supply member; and a motor that is connected to at least a portion of the dual piston and configured to provide rotational power to the at least a portion of the dual piston to linearly reciprocate the dual piston.

5. The pneumatic energy generation device of claim 1, wherein the pneumatic reinforcement unit further comprises a sensor comprising a temperature sensor and a pressure sensor, each being connected to the pneumatic supply member to measure a temperature and the pressure of the pneumatic supply member.

6. The pneumatic energy generation device of claim 5, wherein the pneumatic energy generation device is configured to generate the pneumatic energy including:

a continuous pneumatic energy lower than a preset energy, the pneumatic energy generation device being configured to supply the continuous pneumatic energy continuously; and an explosive pneumatic energy higher than the preset energy, the pneumatic energy generation device being configured to supply the explosive pneumatic energy instantaneously, and wherein the pneumatic energy generation device further comprises a controller configured to control an operation of the pneumatic generation member, enabling the pneumatic supply member to supply one of the continuous pneumatic energy and the explosive pneumatic energy to the actuator.

7. The pneumatic energy generation device of claim 5, further comprising a controller that has a control algorithm configured to determine an operating state according to the temperature of the pneumatic supply member transferred from the temperature sensor, the pressure of the pneumatic supply member transferred from the pressure sensor, and a pre-input command, wherein the operating state comprises:

a first state in which the pressure, equal to a predetermined pressure of the pneumatic generation member, generated from the pneumatic generation member, is supplied to and stored in the pneumatic supply member, a second state in which the pneumatic generation member is overheated, resulting in the pressure according to the pre-input command lower than the predetermined pressure, a third state in which the liquefied gas is consumed and does not exist inside the liquid-gas chamber, and a fourth state in which a portion of the liquefied gas exists inside the liquid-gas chamber.

8. The pneumatic energy generation device of claim 1, wherein a seating member, where an end of the liquid-gas chamber is seated, is positioned on a lower inside of the lower housing, and one central portion of the lower housing is an open space to allow the liquid-gas chamber to be attachable to or detachable from the open space.

9. A pneumatic energy generation device, comprising:

a pneumatic generation unit comprising a pneumatic supply member configured to supply a pneumatic energy to an actuator and a pneumatic generation member configured to generate the pneumatic energy by adjusting a pressure of the pneumatic supply member; and a pneumatic reinforcement unit comprising a liquid-gas chamber configured to accommodate a liquefied gas and a liquid chamber configured to accommodate a liquid, wherein the pneumatic reinforcement unit is configured to selectively mix the liquid into the liquefied gas according to the pressure of the pneumatic supply member, thereby selectively gasifying the liquefied gas and increasing the pneumatic energy while cooling the pneumatic generation member, wherein the pneumatic reinforcement unit further comprises a sensor comprising a temperature sensor and a pressure sensor, each being connected to the pneumatic supply member to measure a temperature and the pressure of the pneumatic supply member, wherein the pneumatic energy generation device is configured to generate the pneumatic energy including:

a continuous pneumatic energy lower than a preset energy, the pneumatic energy generation device being configured to supply the continuous pneumatic energy continuously; and an explosive pneumatic energy higher than the preset energy, the pneumatic energy generation device being configured to supply the explosive pneumatic energy instantaneously, and wherein the pneumatic energy generation device further comprises a controller configured to control an operation of the pneumatic generation member, enabling the pneumatic supply member to supply one of the continuous pneumatic energy and the explosive pneumatic energy to the actuator.

10. A pneumatic energy generation device, comprising:

a pneumatic generation unit comprising a pneumatic supply member configured to supply a pneumatic energy to an actuator and a pneumatic generation member configured to generate the pneumatic energy by adjusting a pressure of the pneumatic supply member; and a pneumatic reinforcement unit comprising a liquid-gas chamber configured to accommodate a liquefied gas and a liquid chamber configured to accommodate a liquid, wherein the pneumatic reinforcement unit is configured to selectively mix the liquid into the liquefied gas according to the pressure of the pneumatic supply member, thereby selectively gasifying the liquefied gas and increasing the pneumatic energy while cooling the pneumatic generation member, wherein the pneumatic generation unit further comprises:

a flow path adjustment valve that is connected between the liquid-gas chamber and the liquid chamber and configured to be opened or closed according to the pressure of the pneumatic supply member to adjust a supply amount of the liquid supplied to the liquid-gas chamber, wherein the pneumatic energy generation device further comprises a controller configured to control an operation of the pneumatic generation member and the flow path adjustment valve to maintain a preset ratio between a pressure amount generated in the pneumatic generation member and supplied to the pneumatic supply member and a gasification amount of the liquefied gas.

\* \* \* \* \*